(12) United States Patent
McConnell (10) Patent No.: US 7,596,568 B1
(45) Date of Patent: Sep. 29, 2009

(54) SYSTEM AND METHOD TO RESOLVE AMBIGUITY IN NATURAL LANGUAGE REQUESTS TO DETERMINE PROBABLE INTENT

(75) Inventor: Christopher C. McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 10/822,499

(22) Filed: Apr. 12, 2004

(51) Int. Cl.
*G06F 17/30* (2006.01)
(52) U.S. Cl. .......................................... 707/100; 707/3
(58) Field of Classification Search ................... 707/3, 707/100, 2; 704/10, 4, 9, 7
See application file for complete search history.

(56) References Cited

U.S. PATENT DOCUMENTS

| | | | | |
|---|---|---|---|---|
| 6,016,467 | A * | 1/2000 | Newsted et al. ................ | 704/9 |
| 6,961,723 | B2 * | 11/2005 | Faybishenko et al. .......... | 707/3 |
| 6,993,475 | B1 * | 1/2006 | McConnell et al. ............ | 704/7 |
| 6,999,963 | B1 * | 2/2006 | McConnell ................. | 707/100 |
| 2003/0009352 | A1 * | 1/2003 | Bolotinikov et al. ........... | 705/1 |
| 2003/0176999 | A1 * | 9/2003 | Calcagno et al. ............... | 704/9 |

OTHER PUBLICATIONS

Andreyev, Y. et al., "Chaotic Processors and Content-Based Search of information in Unstructured Data Bases", *Nonlinear Phenomena in Complex Systems*, 1999, 2(4), 48-53.
Owei, V., "Natural Language Querying of Databases: An Information Extraction Approach in the Conceptual Query Language", *Int. J. Human-Computer Studies*, 2000, 53, 439-492.
Shao, Z. et al., "Transcoding HTML to VoiceXML Using Annotation", *Proceedings of the 15th IEEE International Conference on Tools with Artificial Intelligence*, 2003, 249-258.
Zieman, Dr. Y. et al., "Semantic Labeling-Unveiling the Main Components of Meaning of Free-Text", *Proceedings of the Eight Symposium on String Processing and Information Retrieval*, Nov. 13-15, 2001, 228-235.

* cited by examiner

*Primary Examiner*—Charles Rones
*Assistant Examiner*—Fariborz Khoshnoodi
(74) *Attorney, Agent, or Firm*—Woodcock Washburn LLP (57) ABSTRACT

In response to receiving a natural language request, possible intents may be determined and ranked and an appropriate action performed. Intent may be determined by removing as much ambiguity as possible by leveraging all the available information received to generate and rank interpretations of a user request. Actions may be generated as a result of the ranked interpretations. Actions may include performing a task or search. Search results from multiple pluggable search providers may be returned.

20 Claims, 5 Drawing Sheets

SYSTEM AND METHOD TO RESOLVE AMBIGUITY IN NATURAL LANGUAGE REQUESTS TO DETERMINE PROBABLE INTENT

CROSS-REFERENCE TO RELATED APPLICATIONS

The application is related to patent application Ser. No. 10/822,516 entitled "System and Method to Resolve Ambiguity in Natural Language Requests Using Schema Annotations", filed herewith.

FIELD OF THE INVENTION

The invention relates to computing and in particular to resolving ambiguity in natural language requests.

BACKGROUND OF THE INVENTION

One of the most challenging problems in computer science is the development of a computer that can understand natural language. One of the main reasons for the difficulty of this task is the ambiguity inherent in the way humans communicate. For example, suppose a person says "e-mail Tom about dogs". When such a communication occurs between humans, often the human recipient effortlessly resolves the ambiguity using context, experience, memory, previous knowledge, visual cues (if available) and various other environmental clues to interpret the message. A recipient of the message (say, "John", for instance), may instantly recognize that he is being reminded to send Tom a list of Jack Russell terriers that John has for sale because Tom wants to buy one.

Unfortunately, many computers capable of inverting large matrixes in the twinkling of an eye are stumped when presented with such a natural language request on a search or command line. With respect to searches, a traditional search might look for all documents with the words "e-mail", "to", "John", "about" and "dogs" in it and completely fail to satisfy the user's intent. Similarly, a traditional search query might be generated using a GUI (graphical user interface), for example, choosing "e-mail", "sender", "Tom" etc. but this requires developer intervention and user effort and is typically tied to a particular information source. Known systems that generate an action such as opening an email with "Tom" in the TO field and "Dogs" in the subject field are currently available only by custom-coding.

It would be helpful if there were a way for a computer to use available clues to interpret natural language requests so that the user's intent is divined and thus more relevant results are returned or more appropriate actions are automatically performed. Furthermore, it would be helpful if information could be returned from many (or any) locations, that is, if multiple search providers could respond to the user's interpreted request.

SUMMARY OF THE INVENTION

In response to receiving a natural language request, possible intents may be determined and ranked and an appropriate action performed. Intent may be determined by removing as much ambiguity as possible by leveraging all the available information received to generate and rank interpretations of a user request. Actions may be generated as a result of the ranked interpretations. Actions may include performing a task or search. Search results from multiple pluggable search providers may be returned.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Suppose a user enters "E-mail to Tom about dogs". What is the user's intent? To divine the user's intent, one or more of the following information items may be required: information about what is possible, information about what is probable, information about the environment and information about how language is expressed over the above. Some of the information required to divine intent may be available. The intent in this case may be one of the following:

the user is searching for e-mails with "Tom" in the TO field and "dogs" in the SUBJECT field the user is searching for e-mails with "to Tom about dogs" in the SUBJECT field the user wants to compose a new email with "Tom" in the TO field and "dogs" in the subject field the user wants to search for documents with the words "e-mail to Tom about dogs" in it.

Once the possible intents have been determined, a calling program may transform one, some or all of the possible intents into actions. For example, an intent may be transformed into a set of documents that the intent represents. That is, a set of constraints may be generated over the documents in the system and a search may be conducted to return the documents satisfying the constraints. Alternatively, an action may be taken, such as, for example, an e-mail message screen may be opened and some of the fields in the e-mail may be automatically populated.

Exemplary Computing Environment

Figure 1:
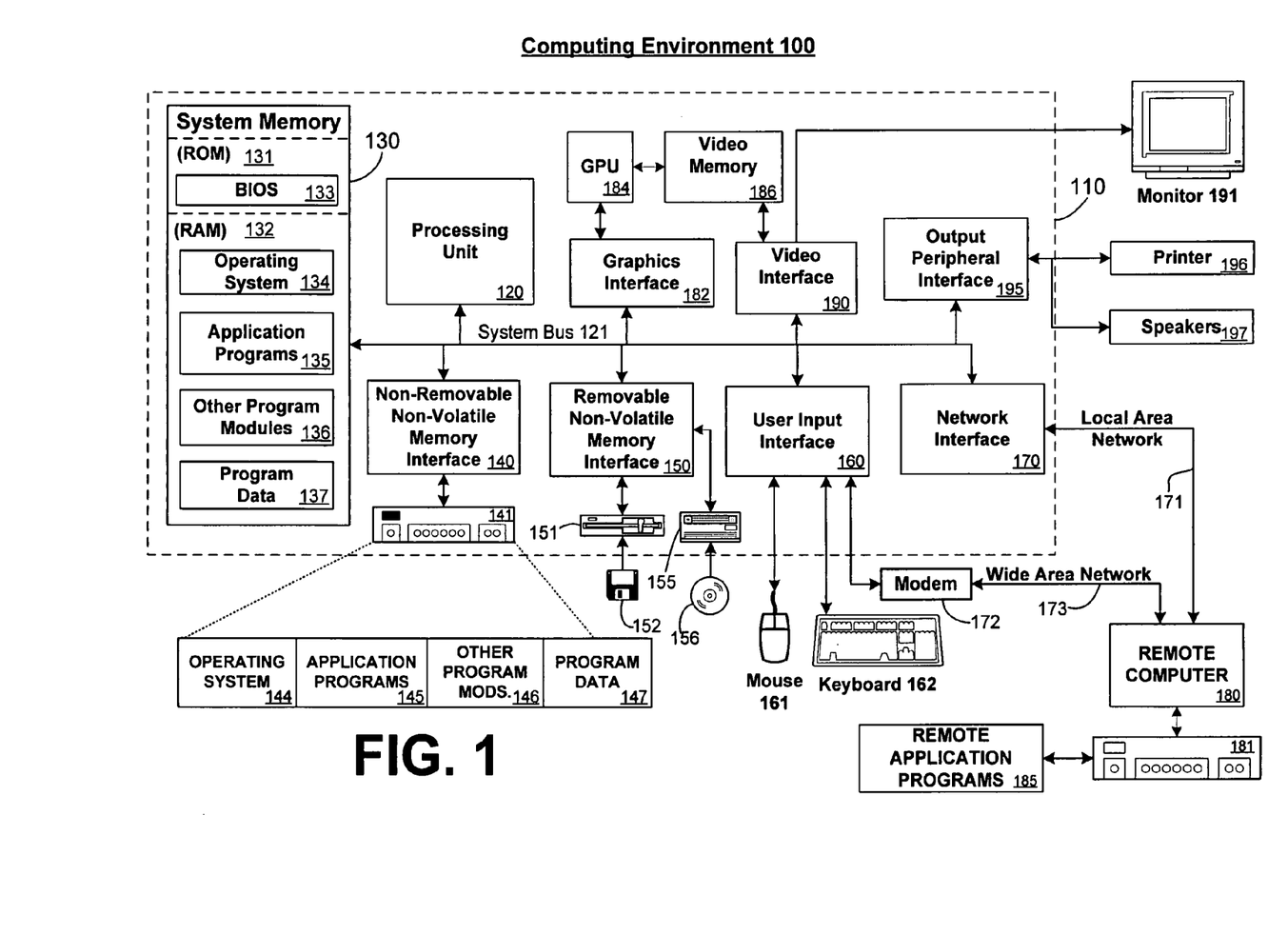
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, and program modules. By way of example, and not limitation, communication media includes wired media such as a wired network or direct-wired connection. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 2:
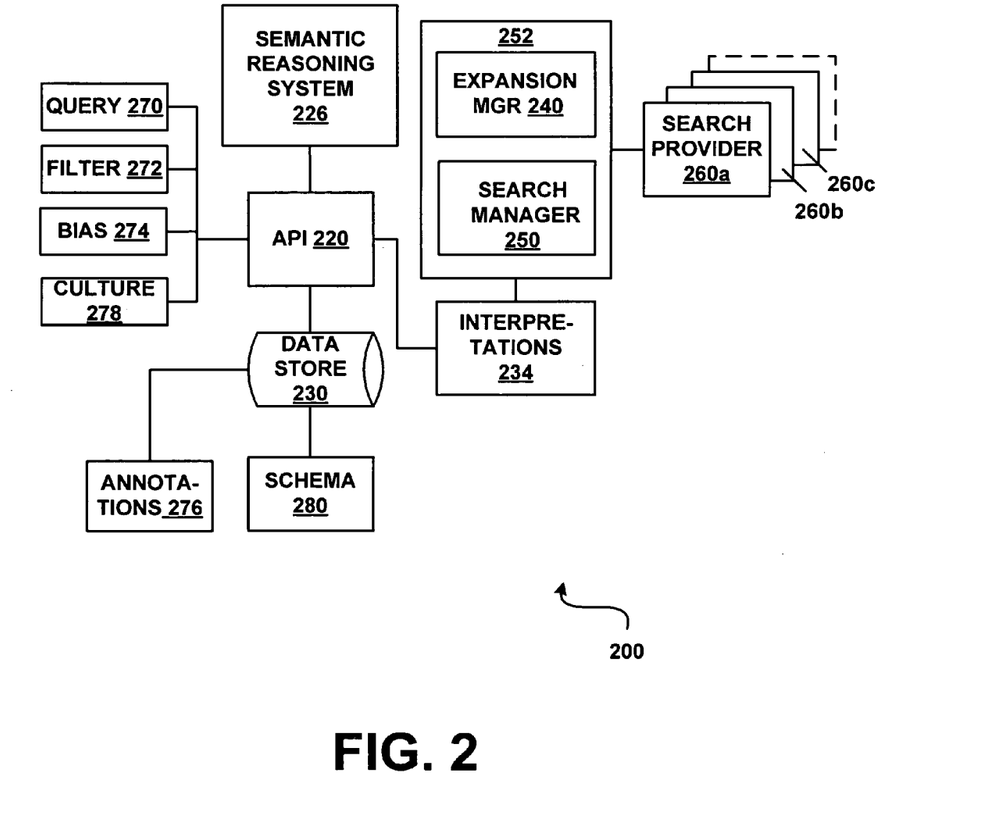
FIG. 2 is a block diagram of a system for resolving ambiguity in natural language requests to determine probable intent in accordance with one embodiment of the invention.

System and Method to Resolve Ambiguity in Natural Language Requests to Determine Probable Intent FIG. 2 is a block diagram illustrating an exemplary system for resolving ambiguity in natural language requests to determine probable intent in accordance with one embodiment of the invention. In FIG. 2, a system 200 for resolving ambiguity in natural language requests to determine probable intent may reside in whole or in part on one or more computers such as computer 110 described with respect to FIG. 1. System 200 may include one or more of the following components: an applications programming interface (API) 220, a semantic reasoning module 226, a data store 230, an expansion manager 240, and a search manager 250. API 220 may be incorporated into semantic reasoning module 226 or may be an independent component. Expansion manager 240 and search manager 250 may be independent components or may be integrated into an expansion and search manager 252. One or more search providers 260a, 260b, 260c, etc. may be components that can be plugged into system 200 or may be integrated within system 200. System 200 may also include one or more components not shown here such as for example, a language service component including word breakers, etc.

In some embodiments of the invention, system 200 may receive inputs including one or more of the following: a query 270, a filter 272, a bias 274, a schema 280, an annotation 276 and/or a culture 278 as well as other inputs discussed below, and may generate therefrom one or more interpretations 234 according to or based on a schema 280 or based on a schema 280 and one or more annotations 276 for input to one or more search providers 260a, 260b, 260c, etc. via a search manager 250 and/or an expansion manager 240.

Figure 3:
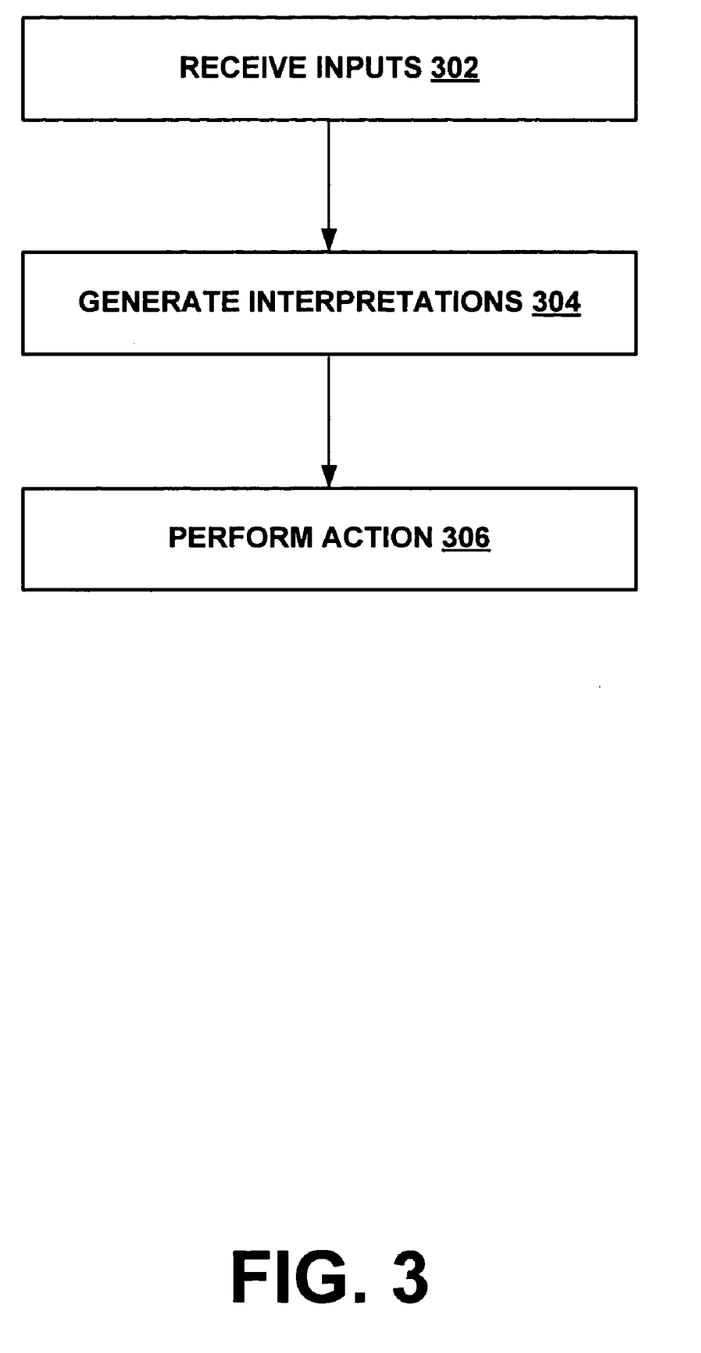
FIG. 3 is a flow diagram of an exemplary method for resolving ambiguity in natural language requests to determine probable intent in accordance with one embodiment of the invention.

FIG. 3 is a flow diagram of an exemplary method for resolving ambiguity in natural language requests to determine probable intent in accordance with one embodiment of the invention. In FIG. 3 at step 302 inputs are received. At step 304 one or more probable intents or interpretations are generated in response to the received inputs. At step 306 an action may be performed in response to one or more of the generated interpretations. The action performed may be an explicit execution of a command, (e.g., "sort by first name", "compose an email to Chris about dogs" or "insert a 3×2 table" and so on) or may be a search conducted by one or more search providers.

Referring concurrently to FIGS. 2 and 3, a request may be the actual words a user typed (a natural language request). Examples of such requests include but are not limited to such requests as: "e-mail from Chris about dogs", "Jazz music by Benny Goodman released in 1945", "documents I printed last week", "benny goodman" and so on. A request may be a search query as illustrated in FIG. 2, as represented by query 270, or may be a request for another type of action.

Divining intent from the words of a request may be accomplished by removing as much ambiguity in the request as possible by taking advantage of available information. Information about what is possible may often be determined by the structure or schema of the associated data. For example, in the case of a search, the data result returned from a search engine typically has a structure—that is, the data the search engine returns may have fields including Title, CreationDate and so on, which define the boundaries of what is possible (what can be returned). In the case of a command, such as "insert a 3×2 table", the words of the request can be interpreted as the command "InsertTable" with the constraints Rows=3 and Cols=2. In some embodiments of the invention, schema information describing the structure of the data is provided by a search provider and is stored in datastore 230. In some embodiments of the invention, annotation information is stored in datastore 230.

Information about the structure of the data desired can often be gleaned from the request itself. That is, the words in the request may imply part of the underlying structure or schema of the desired data or suggest an action to be performed. For example, in the request "e-mail to Tom", the word "e-mail" may imply an underlying type "Message", and the word "to" may imply a property of "Message" called "Recipient". The occurrence of both of these terms in the same request may increase the likelihood that the request's intent can be expressed in terms of a Message object.

Sometimes, the patterns of the characters in the request may provide useful information. For example, a data pattern of "(123)456-1234" may suggest a telephone number. Tom@microsoft.com may suggest an e-mail address. Presence of the words "today", "tomorrow", "next week" "10:30 am" and similar date/time expressions are readily identifiable as date/time information, which may provide clues as to what type of information or action is desired.

Some search providers may provide statistics associated with the frequency of the appearance of certain tokens in various fields. The statistics may provide information concerning how often a token occurs in a specific corpus. For example, the statistics may provide information concerning how often a particular word appears in the body of a group of documents. This information may be provided by a search provider to the system via a standardized input mechanism.

Knowledge of system state may be useful to divine intent. For example, the presence of a particular type of printer on the system may act to increase the likelihood of a request about printers to be about that type of printer. Similarly, the state of the printer (online, offline, out-of-paper, etc.) may be used to divine probable intent.

Logs such as query logs, etc. may be mined to build statistical models to be used to divine intent. For example, if it is known that a particular request has been mapped to a particular result or action in the past, a statistical model built from these results can be used for divining an intent.

In some embodiments of the invention, linguistic information is available about the words in the request. For example, a word in the request may be known to be a noun or an adjective, or part of a noun-phrase or verb-phrase. This information may be utilized by the system 200 to divine intent.

In some embodiments of the invention, API 220 receives the request and analyzes the words of the request and associated information as discussed above to divine the intent of the user request. Other information may also be provided to API 220 from a calling application (not shown) useful in determining probable intents. This information may include any combination of the following: types to reason over from schema(s) 280, filter(s) 272, bias(es) 274, culture 278 and annotations 276. In some embodiments of the invention, a collection of ranked interpretations are generated as constraints over the schema. The constraints may be passed to one or more search providers via search manager 250. In some embodiments of the invention, the constraint language utilized is MICROSOFT's OPath constraint language, although other constraint languages such as XPath, XQuery, QIL, or SQL may be employed. The one or more search providers may return results to expansion manager 240 which may display results according to a specified expansion policy (described more fully below).

In some embodiments of the invention, the available information is analyzed to identify terms (also referred to as features). For example, the individual tokens that make up a query string may be identified as features. Similarly, possible combinations of those tokens into sub-phrases may also be identified as features, as may patterns that are recognized inside the tokens or across multiple tokens, and so on.

Features may be transformed into fragments based on heuristics and schema annotations. A schema is a structural model that defines how objects in the real world are represented in a datastore. A schema may define the structure of the data, including the names of the objects or elements in the data, and the attributes and formatting rules for the objects or elements. For example, a mailing address typically includes a name, address, city, state, and ZIP code. This description of the mailing address is its metadata schema. A schema may be represented in XML (eXtensible Mark-up Language) or other modeling language or via an object type hierarchy. In some embodiments of the invention, the schema is represented using computer-language independent object types (e.g., MICROSOFT® Common Language Runtime or CLR objects, JAVA® Classes and objects, etc.).

A schema in some embodiments of the invention is a collection of structured types of data. The data may be stored in a storage system such as a database, file system or other storage technology. Similarly, the schema may define or embody the structure of an action to be taken and may be passed to the entity performing the action from the requestor of the action. A search provider for the storage technology may return the object types defined by its schema. In some embodiments of the invention, these results may be returned in the form of machine-independent objects.

For example, consider the following schema:
Enum EntryType={Add,Remove}
Class Bank
{
Int ID
String Name
}
Class Account
{
Int ID
Int BankID
String AccountName
}
Class Entry
{
Int AccountID
Int ID
DateTime TransactionDate
String Payee
Float Amount
EntryType Type
}

Each field of each type is a property. (ID and Name are properties of the object type Bank). The associated search provider may return objects of type Bank, Account, and Entry.

One or more schema annotations, as represented by exemplary annotations 276 may also be available to system 200. In some embodiments of the invention, annotations are supplied. In some embodiments of the invention, annotations may be authored externally, enabling system 200 to be data-driven and open-ended. That is, new authored data (authored data as used herein is any data that requires something external to the system in order to be explicitly created) may be added at any time. Annotations may be created to enhance the relevance of the system, to extend it, to define new types of data and so on. System 200 processes annotations by using the annotation data in the creation of fragments. Annotations are described more fully below.

A fragment may be considered a possible part of a solution. Exemplary fragments include type, a property of a type, a value for a type-plus-property, a constraint over a type and explicitly specified results. Fragments may be identified as "compatible" based on an underlying type system. In some embodiments of the invention, each token in a sentence or request may have one fragment selected for it. An interpretation is made up of a set of compatible fragments from those possible for the input query. That is, compatible fragments may be combined together into an interpretation with a score. The resultant set of fragments may be referred to as a collection of ranked interpretations, representing a list of probable intents, a best guess as to the intents of the user, and may be presented in an order of "most probable" to "least probable". The collection of ranked interpretations may be consumed directly (e.g., as commands, "sort by first name") or they may be expanded into a set of objects represented by the interpretation (e.g., treated as search intents).

For example, upon receiving a request for "show me large deposits to my USBank account", the combination of the above annotations in some embodiments will result in the generation of the following fragments:

"large"→Entry.Amount>1000.0
"deposits"→Entry
"USBank"→BankID=123
"account"→Account The underlying structure of the type may be used to determine which fragments are compatible and thus are combined. The resulting constraint statement sent to the search provider may thus be:

Entry where AccountID=A and A.BankID=123 and Amount>1000.00"

Thus, it will be appreciated that in some embodiments of the invention, rather than analyzing the sentence structure of the request at a linguistic level, the request is analyzed at a conceptual level as expressed by a data schema via a type hierarchy. That is, if, for example, a first term could mean two different things expressed in two different types, the fact that a second term in the request refers to the first type may be used to divine that the first term also refers to the first type. To illustrate, suppose there are two available types, "Message" and "AudioTrack". Both "Message" and "AudioTrack" may have a date/time property called "CreationDate". Suppose the request "Messages created in July" is received. In some embodiments of the invention, the following fragments are generated:

the fragment Message is generated from "Messages"
Message.CreationDate and AudioTrack.CreationDate are generated from "created in July"

The fragments Message and Message.CreationDate are compatible because both Message and Message.CreationDate are of type Message and therefore these fragments in some embodiments of the invention are combined. The score (relative score determines relative rank) is higher for the combination of Message and Message.CreationDate than is the score for AudioTrack.CreationDate because more fragments (that is, two) have been combined to create the combination than have been combined to create AudioTrack.CreationDate (that is, one). The collection of ranked interpretations that result from this process thus includes Message/Message.CreationDate and AudioTrack.CreationDate.

One or more filters, as represented by exemplary filter 272 may be specified. In some embodiments of the invention, a calling program passes in explicit knowledge concerning the intent of a user via one or more filters, hence a filter may represent a constraint fragment. In some embodiments of the invention at least one interpretation per filter is generated. A filter may define a type allowed for a search result or action and/or define restrictions imposed upon a search result or action. Exemplary filters include but are not limited to filters for documents, videos, music, messages, contacts and files. An exemplary use of a filter is as follows: Suppose an e-mail application has a search dialog. The calling e-mail application may know, for example that only e-mails, meetings and tasks are desired even though other types of objects, etc. may be returned by the associated search provider. Hence a filter of e-mail messages, meetings and tasks may be specified as constraint fragments. In some embodiments of the invention, a filter may specify that only items of a specified type found in a specified folder are to be returned.

Specification of a filter may prevent a search provider from being called because that search provider cannot return the specified type of results. For example, if the calling application specifies a filter for e-mail messages, the ranked interpretation(s) generated may not be sent to an Internet search engine that does not include e-mail messages in its search domain.

One or more biases, as represented by exemplary bias 274 may also be specified or received from a calling application. A bias in some embodiments is a constraint fragment that is passed in to influence the rank of search results. A bias may act to raise or lower the rank of a search result obtained by the execution of a particular individual interpretation associated with the bias. For example, an email application may specify a filter of "e-mail" and a bias of "If it is in the current folder, rank it higher." As a result of this bias an e-mail that appears in the current folder may receive a higher rank in the returned search results than a similar message appearing in another folder.

A bias may be determined by the calling application in any way. For example, a music playing application may employ a filter to specify the selection of music of a particular musician. A bias may specify that if the music is blues or rock, it should be rated more highly. The application may have selected the "blues or rock" bias by what music is played the most, by most-recently played music or by any other suitable method.

Culture as represented by exemplary culture 278 may also be received. Culture (e.g., US English, English, Japanese, etc.) in some embodiments determines the annotations and language-dependent heuristics to be employed. In some embodiments of the invention, if no culture is specified, the culture of the calling application or user interface is used.

After all the available information has been analyzed, and known constraints are applied, the resulting collection of ranked interpretations represent a list of probable intents, presented in an order of "most probable" to "least probable". The collection of ranked interpretations implemented as a set of constraints on a schema may be consumed directly (e.g., as commands, "sort by first name") or they may be expanded into a set of objects represented by the interpretation (e.g., treated as search intents). The collection of interpretations to be executed may be sent to one or more search providers to be executed. In some embodiments of the invention, the search providers to be accessed can be explicitly specified.

In some embodiments one or more search provider will be passed the set of constraints, one or more filters, biases, and the original query. Each search provider is expected to return a relevance-ordered set of results, however no requirements are placed on how the search provider goes about retrieving results. Some of the information passed to the search provider may not be processed. A search provider may provide results based on a conventional IR (information retrieval) search, database search (e.g., a SQL SERVER® search, DB2 search, etc.), or whatever data source the search provider can access.

In some embodiments of the invention, only the most probable interpretation is sent to the search provider for execution. Alternatively interpretations may be generated for execution according to a specified policy. Exemplary interpretation generation and execution policies include but are not limited to the following:

execute a specified number of interpretations execute all interpretations which are ranked within a specified percentage of the best (highest ranked) interpretation     execute the best (highest ranked) interpretation and an interpretation that searches for all the words in the request (query)

execute the best (highest ranked) interpretation for each filter     execute the best (highest ranked) interpretation for each filter and search for all the words in the request (query).

A search provider may receive the collection of interpretations to be executed and generate a set of results, each result associated with a relevance score. The results may be displayed as they are returned (streaming mode), in relevance order, as blocks of results from search providers, merged results from multiple search providers in relevance order and so on. Duplicate results may be eliminated. In some embodiments of the invention, a subset of the returned search results may be selected for display. The selected subset may be a explicitly specified by the calling application, or may be inferred from the query or request, or may be a combination thereof. The results may be displayed in table format. For example, a request such as "chris phone number" may generate columns for Contact name and all the phone number fields associated with the Contact. Search results from search providers may be returned to an expansion manager for display processing.

In some embodiments of the invention, an expansion policy may be specified. Exemplary expansion policy options include but are not limited to the following information:

the minimum or maximum number of results to be displayed on a page     the maximum number of results to include per filter or per search provider     the number of results to be displayed from each search provider     the number of results to be displayed from the best of the combinations of interpretations of search providers.

In some embodiments of the invention, a duplication removing policy may be specified. Exemplary duplication removal policies include     keep all duplicates     keep the duplicate with the highest relevance     keep the most recent duplicate In some embodiments of the invention, a search result is encapsulated within a generic wrapper. The search result wrapper may include information including but not limited to a generic title and description, the interpretation that came from the search provider, its rank (score), modification time, unique identifier and so on. The wrapper in some embodiments points to the object returned by the search provider.

Figure 4:
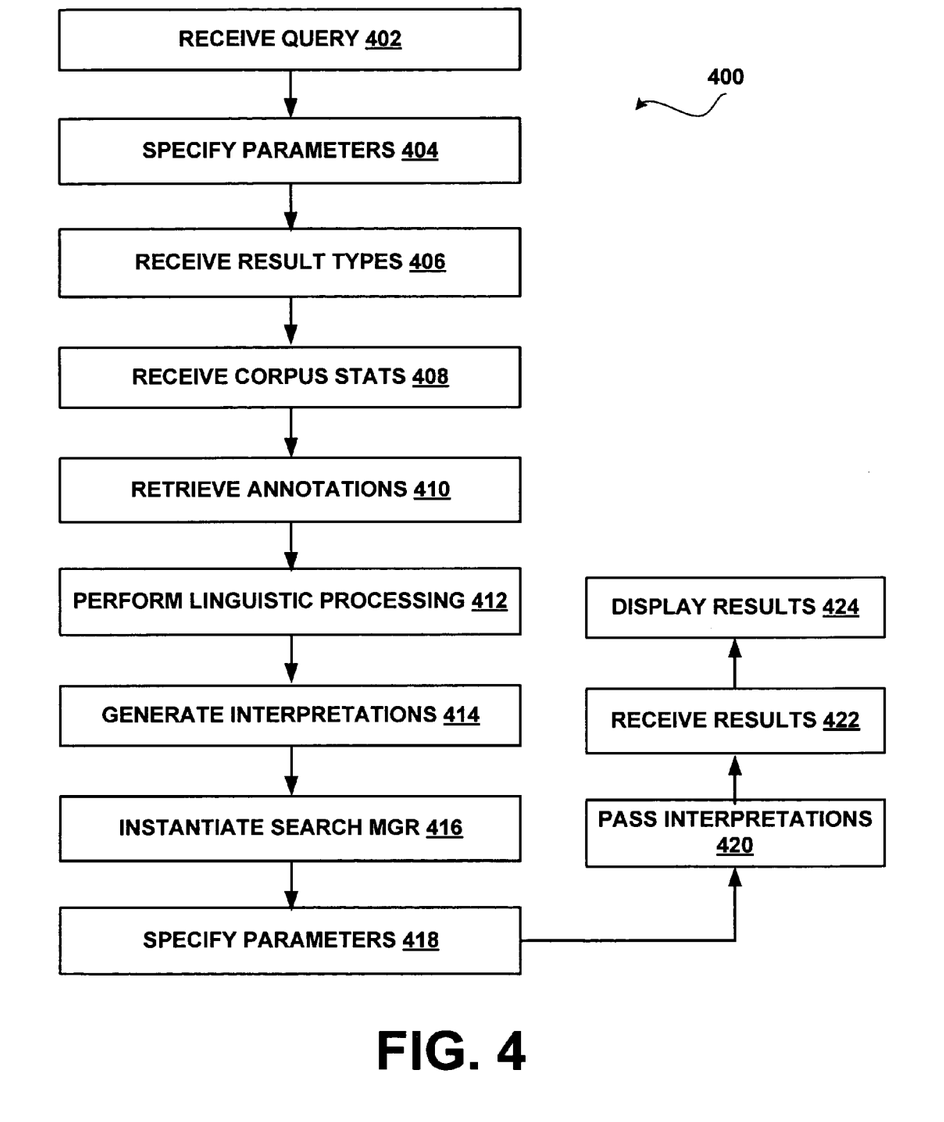
FIG. 4 is a more detailed flow diagram of an exemplary method for resolving ambiguity in natural language requests to determine probable intent in accordance with one embodiment of the invention.

FIG. 4 is a flow diagram of an exemplary method for resolving ambiguity in natural language search queries to determine probable intent in accordance with one embodiment of the invention. At step 402 a search query may be received. In response to receiving the search query, a search object is instantiated. At step 404, parameters may be specified, including one or more of the following: one or more filters, biases, duplication removal policy options, interpretation generation and execution policy options, search providers and so on. Steps 406 through 408 are optional steps that may be performed in any order for each selected search provider. Steps 406 through 424 are optional. At step 406 possible result types may be retrieved from one or more search providers. At step 408, corpus statistics may be retrieved from a search provider. At step 410 annotations may be retrieved. At step 412 linguistics processing may be performed (e.g., word breaking, etc.) At step 414 a set of ranked interpretations may be generated as described above. At step 416 a search manager object may be instantiated. At step 418 additional parameters including the expansion policy options, selection of particular interpretations and so on may be selected. At step 420 the search manager may pass the selected search providers the set of ranked interpretations. At step 422 results may be received back from the search providers and at step 424 the results may be displayed in accordance with the display options selected.

Generation of Annotations

An annotation is a piece of extra information about the data and is sometimes referred to as metadata. Annotations in some embodiments of the invention control the mapping of features to data structures and provide rules for combining fragments. Annotations may be global or local. Global annotations in some embodiments of the invention are used by all applications in the runtime environment whereas local annotations are used only by a single application. A number of types of annotations may be provided. Exemplary annotations include but are not limited to term annotations, state annotations, type annotations, property annotations, value annotations, instance annotations and constraint annotations.

A term annotation in some embodiments is a word or phrase which triggers whatever it is attached to when it is encountered in a request. For example, the terms "email", "e-mail", "message", "messages" and "electronic mail" may all be synonyms for the underlying schema type fragment Message. The term "written by" may be a synonym for the underlying schema type fragment Document.Author and so on. The terms "important", "high priority" may be terms which all indicate a constraint fragment on the schema of Email.Priority>2 and so on.

A state annotation may refer to the state of some part of the user's system. For example, the fact that a particular brand of printer is installed can be used to bias results related to that manufacturer higher by authoring a state annotation.

Standard inheritance rules such as type inheritance, complex types, etc., apply to both the schema modeling language and to the annotations on the schema in some embodiments of the invention. Annotations can be created to enable the identification of types, properties, values, instances and constraints by recognizing words or phrases in a request that identify a particular structure of the schema, such as a type or a property in a type. For example, the word "account" in a request may mean that Account type information is desired.

"To", "From" "CC" and "Subject" may be exemplary properties of an e-mail type. In the "account" example above, a request containing the word "amount" may refer to an Account.Amount property. Properties may themselves be complex types, so sub-properties (nested properties of any depth of nesting) are also possible.

One or more values of a property of a type may be defined. Defined values may be associated with terms. When a term associated with a value is encountered in a request, the value may be added to the query sent to the search provider. For example, the annotation segment:

"Account.Type='Remove'"
Term="check"
Term="checks"
Term="withdrawal"
Term="removal"
Term="withdrawals"
"Bank.ID='123'"
Term="USBank"
Term="US Bank"
Term="US-Bank"
Term="ubank"
Term="ubank.com"

may result in a search provider adding the above constraints to its search.

Constraints may also be defined in an annotation. For example, the following annotation segment:

Entry, "Amount>1000.00"
Term is "large"
Entry, "Amount<10.00"
Term is "small"
Entry, "Amount>=10.00 and Amount<=1000.00"
Term is "medium"

has the effect of defining constraints so that if a request for a medium Account was received, the results returned would be those between 10 and 1000. Complex restrictions on results may thus be defined via constraint annotations.

Figure 5:
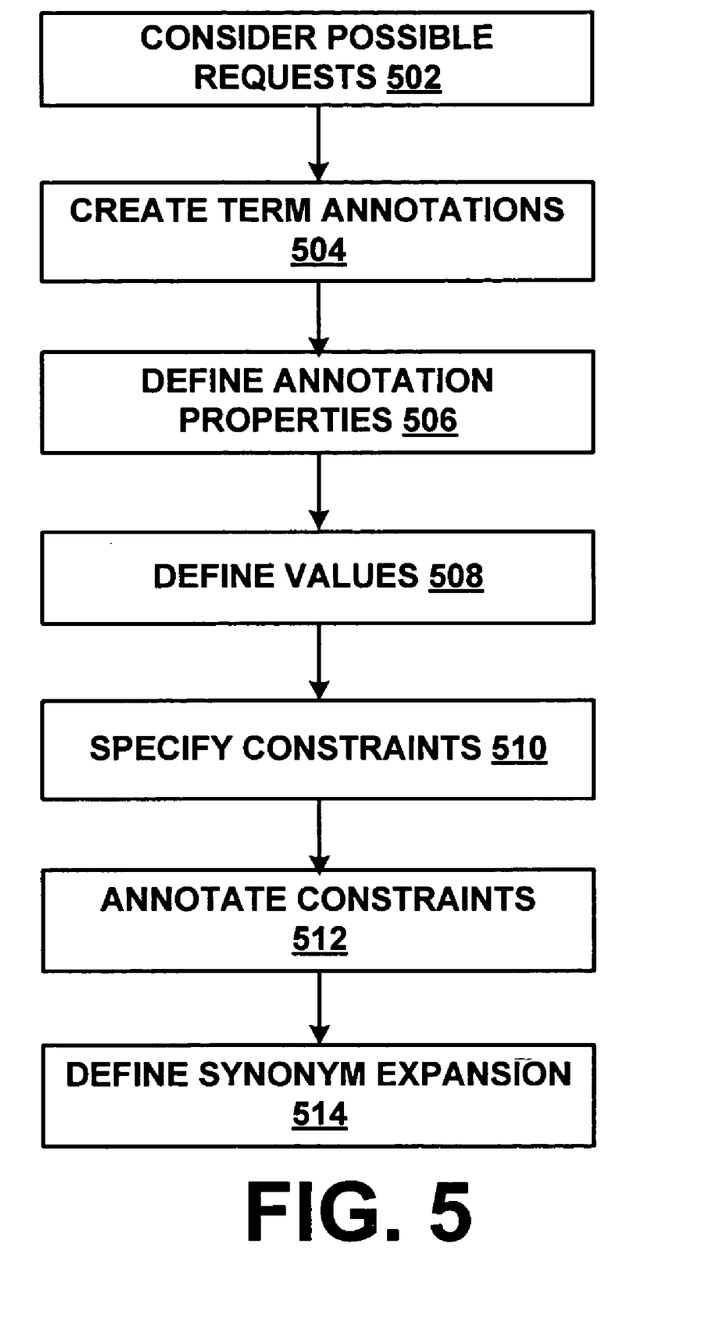
FIG. 5 is a flow diagram of an exemplary method for generating annotations in accordance with one embodiment of the invention.

FIG. 5 illustrates an exemplary method for developing annotations in accordance with one embodiment of the invention. One or more of the steps of FIG. 5 are optional. It will be understood that the steps of FIG. 5 may be performed in any appropriate sequence. Suppose for example, the following portion of a schema is to be annotated:

Class Car
{
Int Year
String Model
String Make
CarType Type
String Serial#
Float Price
}
Enum CarType={Truck,sedan, sports, SUV, minivan,van}

At step 502, various ways that objects of a particular type may be searched for are considered. For example, if a user were looking for newer Ford trucks, the following request may be entered:

"show me ford trucks built in 1999"

If a user were looking for a particular BMW, the following request may be entered:

"show me classic bmws"

If a user were looking for a good deal on a new convertible of no particular Make to buy, the following request may be entered:

"I want an inexpensive new convertible"

At this point, annotations may be generated, computed or authored to handle some of the types of queries or requests that might be received. In some embodiments of the invention, annotations are defined in a declarative hierarchical markup language such as HTML (HyperText Markup Language), XML (eXtensible Markup Language) or XAML (eXtensible Application Markup Language) although it will be understood that any suitable definition language may be used.

At step 504, term annotations may be created. An annotation type can be explicitly specified so that when a particular type is desired to be surfaced, several different (specified) interpretations may be generated. For example, referring to the car example described above, perhaps Term annotations that generate the Car type may be created. They may be generated as a "GeneratedBy" type so that, if triggered, the target object will be created. Variations on the possible words that may be used in a request that are to generate a Car type may be created as follows:

<type name="car">
  <generatedBy>
    <term is="car"/>
    <term is="cars"/>
    <term is="automobile"/>
    <term is="automobiles"/>
    <term is="autos"/>
    <term is="auto"/>
  </generatedBy>

Annotations on properties may be used to identify terms in the input stream which imply a particular property of the type. By identifying the underlying property, interpretations can be built which are expressed in terms of the underlying type. At step 506, annotation properties may be defined to identify fields that are likely to appear in a request or query. For example, the following is an exemplary property annotation for the generatedby property:

<property name="Make">
  <generatedBy>
    <term is="make"/>
    <term is="manufacturer"/>
    <term is="made by"/>
    <term is="brand"/>
  <generatedBy>

These annotations identify that if the word "make" or "manufacturer", etc. is found in a query or request, the property CarMake is being referred to. If an annotation that is marked as "Generated" is triggered, in some embodiments the fragment that represents the object annotated will be created.

Biasing is an annotation property in some embodiments. If an annotation that is marked as "Bias" is triggered, in some embodiments of the invention, a bias is created which will raise or lower the weight of a fragment for an object that was created by a generated annotation type.

Exclusion is an annotation property in some embodiments. If the annotation marked as an exclusion is triggered, any fragment representing the object may be removed from consideration.

In some embodiments of the invention, a weight property enables specific weights to be associated with annotations. It may not be desirable for weights to be explicitly specified for annotation. Weights may be associated with annotations so that differences between annotations may be algorithmically determined.

An ID or identification property in some embodiments is a unique identifier for an annotation. It may be used for logging.

In some embodiments of the invention, multiple textual field can be combined to create a virtual property. For example, a virtual field "contents" may exist which may be defined within the context "music" as artist, album and song title. If none of these field are mentioned in a query or request, the request may be associated via an annotation to the virtual field "contents", resulting in all three items artist, album and song title being searched. That is, if no field is explicitly mentioned in a query, but there are tokens left, those tokens may be searched for in the default location. For example, receipt of the request "doors music" may result in Artist.AlbumTitle and Track being examined for "doors" whereas receipt of the query "music by the doors" may result in looking for "doors" in the artist field because the phrase "by" would generate the Artist property. The creation of virtual properties in some embodiments may be used as a means of query expansion. The creation of virtual properties may be especially effective when the semantic idea of the user request or query does not map neatly to a single property, but instead is linked to multiple properties in the underlying schema. For example, suppose the word "about" is encountered within the context of documents. In the query or request: "documents about fishing", "about" may refer to the Subject property, the Title property, the Comments property or it may refer to the Body of the document. Instead of selecting only one of the fields in which to look for "fishing", the Subject, Title, Comment and Body may be selected for examination for the word "fishing" via a virtual property.

Matching rules may be defined to determine how matching should be performed so that a particular Type of recognized data can be mapped to a specified property. For example, suppose a Document has a DateCreated property and a DateLastPrinted property. Suppose a request "Documents 3/1/2004" is received. An annotation may specify a matching rule such as "given a date and no other evidence as to which date property the date should be mapped to, default to mapping to this specified field". If selection of just one field as a default is not desired, definition of a virtual property, as described above, may enable a set of fields to be mapped to for the default.

In some embodiments an exact match means that the term must match the query or request in its entirety. An exact minus noise property may specify that after noise words (e.g., the, a, and so on) are removed, if the query matches the annotation in its entirety, the annotation will be triggered.

Definitions for all the properties of the annotation may be created. In some embodiments of the invention, annotation property defaults are provided but may be overridden by explicit definition of the properties.

In some embodiments of the invention, annotations may be used to define values for a property. For example, it may be useful to define a value if a search provider does not support or provide statistics for the property or if there are known values for the property (that, for example, a user is likely to know and use in a search) or if the internal representation of the value does not equate to the query representation (e.g., "ford"→typeof(car), "make='193949'"). No statistics are likely to be available for this query). At step 508, values may be created. Exemplary value definitions may be as follows:
    <property name="make">
    <value is="Honda">
    </value>
    <value is="ford">
    </value>
    <value is="bmw">
    </value>
    .
    .
    .
    </property>

At step 510, the values defined in step 508 may be annotated to map the tokens to specific values. For example, the following value annotations may be made:
    <property name="make">
    <value is="Honda">
        <generatedBy>
            <term is="Honda"/>
        </generatedBy>

</value>
<value is="ford">
    <generatedBy>
        <term is="ford"/>
    <generatedBy>
    <biasedBy type="up">
        <term is="tough"/>
    </biasedBy>
<value>
<value is="bmw">
    <generatedBy>
        <term is="BMW"/>
        <term is="Bavarian Motor Works">
        <term is="Bavarian Motor Werks"/>
        <term is="Bavarian Motorworks">
    <generatedBy>
</value>

It will be noted that multiple versions of "Bavarian motor works" have been created to accommodate the numerous ways in which a user may phrase a request. It will be understood that regardless of the spelling, semantically, all of these annotations are equal. It will be noted that the term "tough" is used as a bias up instead of as a GeneratedBy. In some embodiments of the invention, "tough" by itself does not provide enough information to determine that a user is talking about Ford (whose slogan is 'Ford tough'), but if another piece of information is available (such as statistics, other annotations, etc.) then the likelihood that the user is referring to Ford is increased. Annotations may be created for one, some or all of the known values, in this case, all makes, and all models.

In some embodiments of the invention, annotations may be used to define constraints for a property. For example, a constraint may be used to express a compound statement (e.g., "Microsoft office"→typeof(file), "ext='doc' or ext='ppt' or ext='xls'"). At step 510, constraints may be created.

Hence, in some embodiments of the invention, given a natural language query such as "show me large deposits to my USBank account" an appropriate description of the interpretation will be generated in an appropriate constraint language using all of the appropriate fragments based on the relevant annotations, using the underlying structure of the type to decide which fragments are compatible with each other.

For example, in the above car scenario, the following constraints may make sense within the context of the desired objects:

1. Constrain Year to have definitions of Classic, Antique, and New
2. Constrain Price to have definitions of cheap, mid-price, and expensive.
3. Create Constraints which combine legal combinations of Make and Models An exemplary constraint definition thus may be as follows:
    <type name="car">
    <constraint is="Year <1950"/>
    <constraint is="Year >=1950 and Year <1970"/>
    <constraint is="Price <15000.0"/>
    <constraint is="Make='ford' and model='Explorer'"/>

At step 512, constraints may be annotated, in a similar fashion to the way values and properties were annotated as described above: An exemplary constraint annotation may be:
    <type name="car">
    <constraint is="Year <1950">
        <generatedBy>

```
        <term is='antique'/>
        <term is='old'/>
        <term is='vintage'/>
    <generatedBy>
<constraint>
<constraint is="Year >=1950 and Year <1970">
    <generatedBy>
        <term is='classic'/>
    <generatedBy>
<constraint>
<constraint is="Price <15000.0">
    <generatedBy>
        <term is='inexpensive'/>
        <term is='cheap'/>
        <term is='less-expensive/>
        <term is='low-end'/>
        <term is='lowend'/>
    <generatedBy>
<constraint>
<constraint is="Make='ford' and model='Explorer'">
    <generatedBy>
        <term is="ford explorer"/>
    <geneartedBy>
<constraint>
```

At step 514 synonym expansion may be defined. Synonym expansion in some embodiments provides additional words to be searched for. This may improve the number of search results that are returned. For example, suppose an annotation is defined that specifies a set of synonyms for purposes of expanding a search. Suppose the following:

Type Document
Term is="document"
Term is=="doc"
Term is="docs"
Property Body
Term is "about",
Term is "containing"
  expandSynonyms {"Tom", "Thomas", "Tomas", "Thom"}
  expandSynonyms {"cars", "car", "auto", "automobile", "auto-mobile"}

Suppose a user has specified the query: "find docs about cars"

"docs" identifies a type Document

"about" identifies the property Body

Suppose it is determined based on word placement that "cars" is a blurb (text to search for). In some embodiments, the interpretation may be:

Find typeof<Document>, "body contains 'cars'"But cars is a member of list of synonyms to expand the search for, so the query may be expanded to be:

Find typeof<Document>, "body contains 'cars' or body contains 'car' or body contains 'auto' or body contains 'automobile' or body contains 'auto-mobile'"

Hence, the search may be constructed so that if a document is surfaced based on matching "cars" it is a higher ranked result then if it surfaces on the alternatives.

In some embodiments of the invention, blurbs are token(s) which are left over after all of the terms which matched annotations are removed. Blurbs thus may represent the actual data which is being searched for. For example, "email about IBM" may use the term "email" to determine the type should be Email object, the term "about" to identify that they are probably talking about the Email.Subject property, or the Email.Body object. Left over is the token "IBM". This is considered to be the item to be searched for in the Subject and Body of email messages.

In some embodiments of the invention, hard-coded algorithms such as proximity may be used to determine where a blurb should be passed. Some search providers may have the ability to pass statistics on the frequency a blurb shows up in particular properties. This information may be used to resolve ambiguity concerning the placement of blurbs.

In some embodiments of the invention, Synonym Expansion for expanding blurb search may be specified. In addition, synonyms may be defined for search expansion of blurbs. For example, an author may specify that if either "IBM" or "International Business Machines" is a blurb, then the search should be expanded to search for both terms. Hence, in some embodiments, the OPath Email, "Subject contains 'IBM' or Body contains 'IBM'" would become, Email, "Subject contains 'IBM' or Subject contains 'International Business Machines' or Body contains 'IBM' or Body contains 'International Business Machines'" Synonym expansion for blurbs may be used effectively for people names, company names, well-known acronyms, etc. (e.g., "Suzi", "Susi", "Suzy"). Synonym expansion may be effectively used when the object being searched over has synonyms (e.g., CPU, Central Processing Unit, Processor) and/or when the object searched over is commonly misspelled.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computer implemented system for resolving ambiguity comprising:
   a processor;
   the processor operatively coupled to a computer readable storage medium including program modules that include executable instructions, the computer readable storage medium including:
   at least one program module that receives inputs;

at least one program module configured to parse a grammatical structure of the received inputs to identify a token not present in the received inputs, wherein the token includes a word that is statistically associated with documents that have grammatical structures similar to the received inputs;

at least one program module configured to add the token to the received inputs thereby generating a modified inputs; and at least one program module configured to generate from the modified inputs, a collection of ranked interpretations representing a list of probable intent comprising a set of fragments of data types structurally compatible to other fragments in the set, wherein a fragment of the set of compatible fragments is generated by analyzing a grammatical structure of one or more of the modified inputs at a linguistic level, wherein the collection of ranked interpretation is determined based on a number of matching data types;

connecting to a plurality of search providers and receives a collection of search results from at least one of the plurality of search providers and displaying results according to a specified expansion policy, in relevance order, as blocks of results from search providers, merged results from multiple search providers in relevance order and eliminate duplicate results.

2. The system of claim 1, wherein the inputs comprise a natural language request.

3. The system of claim 1, wherein the inputs comprise a filter.

4. The system of claim 1, wherein the inputs comprise a bias.

5. The system of claim 1, wherein the inputs comprise a culture.

6. The system of claim 1, wherein the inputs comprise a schema for data to be operated upon.

7. A computer implemented method for resolving ambiguity in a natural language request, the method comprising:

in response to receiving a natural language request and at least one input at a computer system, parsing a grammatical structure of the at least one input to identify a token not present in the at least one input, wherein the token includes a word that is statistically associated with documents that have grammatical structures similar to the at least one input;

adding the token to the at least one input thereby generating a modified at least one input;

generating a plurality of ranked interpretations representing a list of probable intent comprising a set of fragments of data types structurally compatible to data types in the modified at least one input, wherein a fragment of the set of compatible fragments is generated by analyzing a grammatical structure of the request at a linguistic level; and performing an action in response to at least one of the plurality of ranked interpretations;

connecting to a plurality of search providers and receives a collection of search results from at least one of the plurality of search providers and displaying results according to a specified expansion policy, in relevance order, as blocks of results from search providers, merged results from multiple search providers in relevance order and eliminate duplicate results.

8. The method of claim 7, wherein the action comprises performing a search.

9. The method of claim 7, wherein the action comprises executing a command represented by the at least one of the plurality of ranked interpretations.

10. The method of claim 7, wherein the at least one input comprises a filter.

11. The method of claim 7, wherein the at least one input comprises a bias.

12. The method of claim 7, wherein the at least one input comprises a culture.

13. The method of claim 7, wherein the at least one input comprises a schema for data upon which the action will be taken.

14. The method of claim 7, wherein generating the plurality of ranked interpretations comprises:

analyzing the natural language request to determine a plurality of relevant terms, associating each of the plurality of relevant terms with at least one structure of a plurality of structures in a schema associated with data upon which the action will be taken;

combining terms associated with the at least one structure to generate at least one interpretation of the plurality of interpretations; and assigning a rank to the at least one interpretation.

15. The method of claim 7, further comprising receiving a set of parameters.

16. The method of claim 15, wherein the set of parameters comprises an expansion policy.

17. The method of claim 15, wherein the set of parameters comprises an interpretation generation policy.

18. A computer-readable storage medium comprising computer-executable instructions for:

in response to receiving a natural language request, parsing the grammatical structure of the natural language request to identify a token not present in the natural language request, wherein the token includes a word that is statistically associated with documents that have grammatical structures similar to the natural language request;

adding the token to the natural language request thereby generating a modified natural language request;

analyzing the modified natural language request by analyzing a grammatical structure of the modified natural language request at a linguistic level to determine a plurality of relevant terms;

associating each of the plurality of relevant terms a data type to generate at least one fragment;

combining the at least one fragment with other compatible fragment to generate at least one interpretation of the natural language request representing a probable intent, wherein compatibility is determined based on matching words and matching data types;

assigning a rank to the at least one interpretation based on the number of matching data types;

connecting to a plurality of search providers and receives a collection of search results from at least one of the plurality of search providers and displaying results according to a specified expansion policy, in relevance order, as blocks of results from search providers, merged results from multiple search providers in relevance order and eliminate duplicate results; and interpretation providing the ranked interpretation to a search provider.

19. The computer-readable storage medium of claim 18, comprising further computer-executable instructions for performing a search.

20. The computer-readable storage medium of claim 18, comprising further computer-executable instructions for executing a command represented by the at least one interpretation.

* * * * *